Nov. 27, 1956  H. R. DE VLIEG  2,771,798
GROOVING OR FACING HEAD
Filed April 19, 1951  3 Sheets-Sheet 1
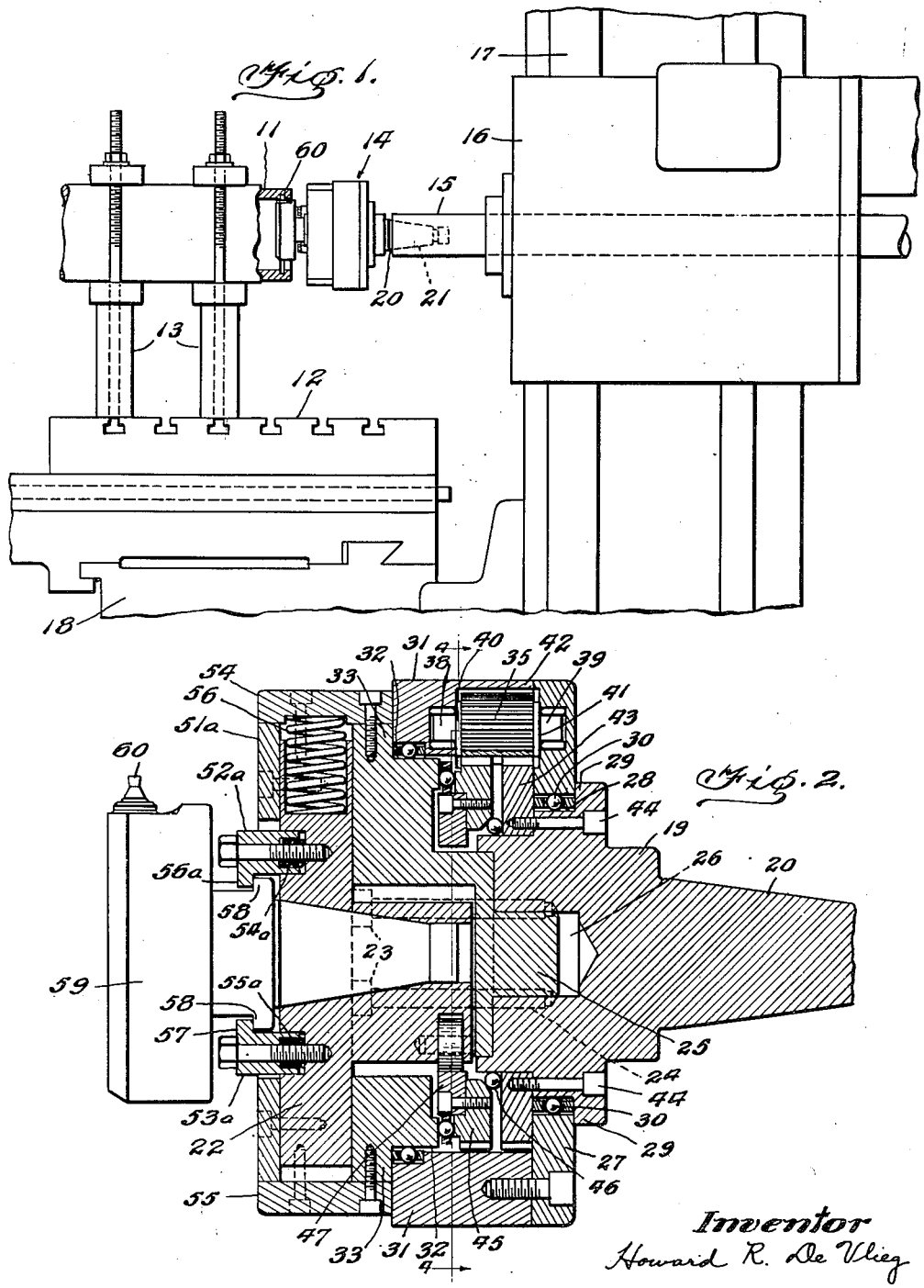

Nov. 27, 1956
H. R. DE VLIEG
2,771,798
GROOVING OR FACING HEAD
Filed April 19, 1951
3 Sheets-Sheet 2
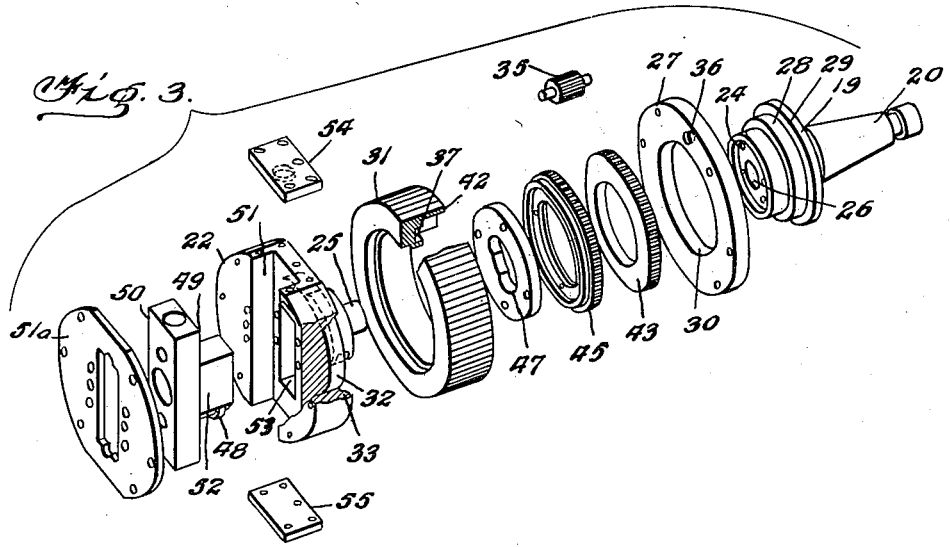
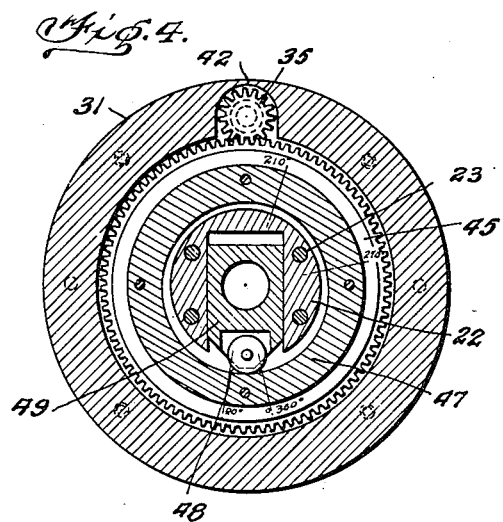
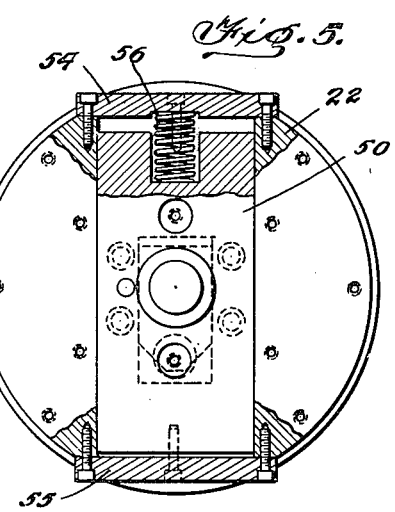
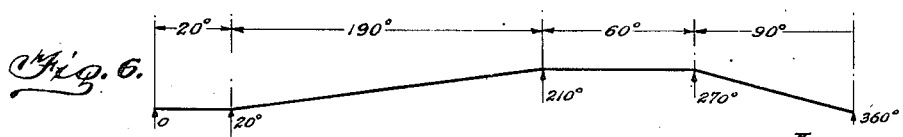
Inventor
Howard R. De Vlieg
By McCanna and Morsbach
Attorneys Nov. 27, 1956     H. R. DE VLIEG     2,771,798
GROOVING OR FACING HEAD
Filed April 19, 1951     3 Sheets-Sheet 3
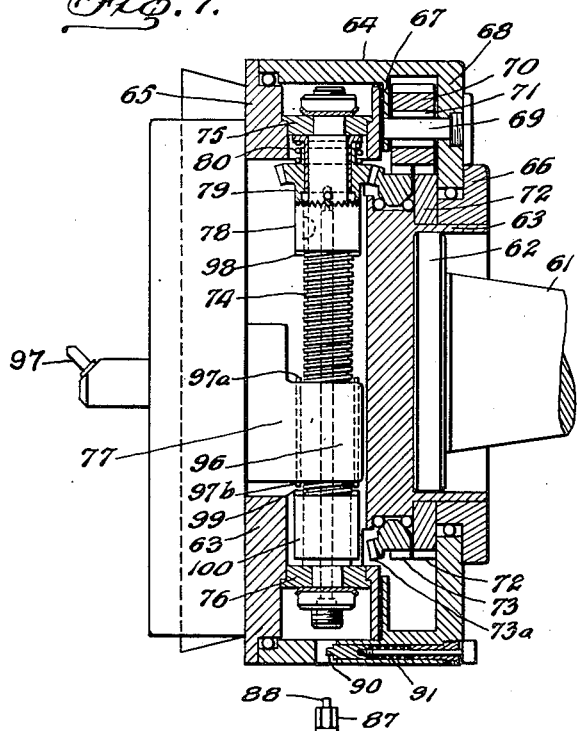
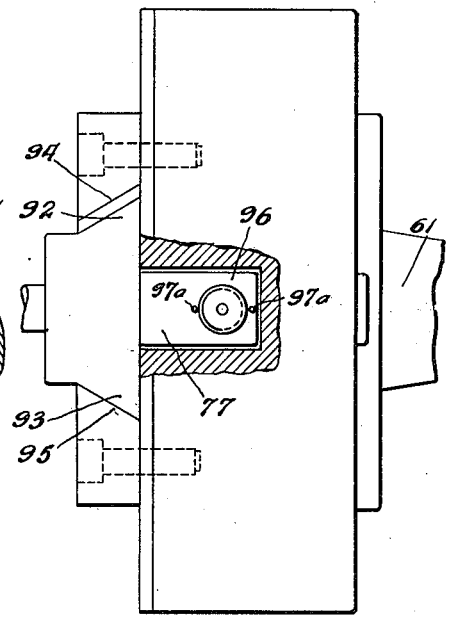
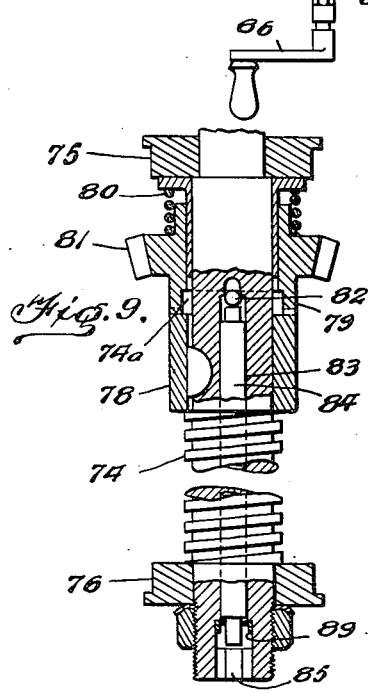
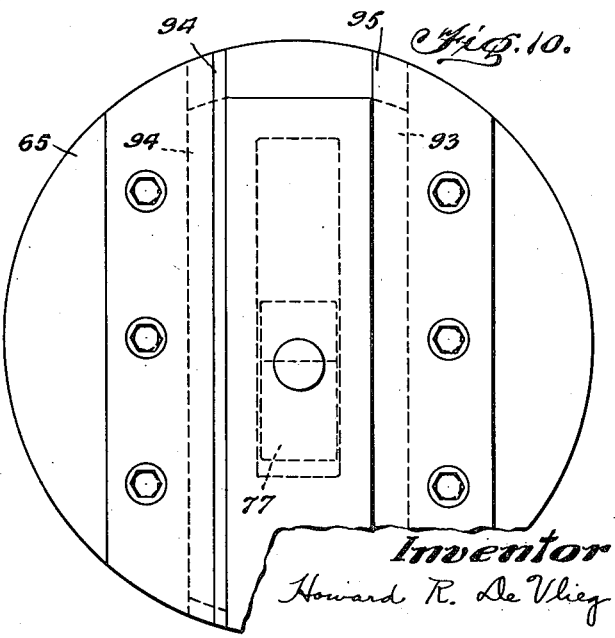
Inventor
Howard R. De Vlieg
By McCanna and Morsbach
Attorneys

United States Patent Office 2,771,798
Patented Nov. 27, 1956

2,771,798

GROOVING OR FACING HEAD

Howard R. De Vlieg, Grosse Pointe Woods, Mich., assignor to De Vlieg Machine Company, Detroit, Mich., a corporation of Michigan Application April 19, 1951, Serial No. 221,783

1 Claim. (Cl. 77—58)

This invention relates to machine tools and has more particular reference to what is commonly known as a grooving or facing head. This is a device for carrying a grooving cutter or the like in which the cutter is moved in a feed movement transversely of the axis about which the head rotates.

It is an object of this invention to provide an improved grooving or facing head of the character described.

A further object of this invention is to provide a novel mechanism for imparting feed movement to the cutter holder of a device of the character described in which only a slight force exerted by the operator on a portion of the mechanism during rotation of the device is sufficient to cause displacement of the cutter-carrying part transversely of its rotational axis.

Another object of this invention is to provide a novel mechanism of the character described in which rotation of the device and a retarding force exerted by the operator on another portion of the mechanism to prevent its rotation combine to cause the cutter to move transversely of its rotational axis as it rotates, whereby to provide a sensitive and accurate control of the cutter.

Other and further objects and advantages of the invention will be apparent from the following description of preferred embodiments thereof.

In the drawings:

Figure 1 is a side elevation illustrating a typical application of a grooving or facing head embodying the present invention;

Fig. 2 is a longitudinal sectional view illustrating the grooving or facing head mechanism according to the present invention for cutting an annular internal groove in a work piece;

Fig. 3 is an exploded perspective view of the main components of the grooving head illustrated in Fig. 2;

Fig. 4 is a sectional view along the line 4—4 in Fig. 2 illustrating the coaction between the cam and the slide to which the cutter is attached;

Fig. 5 is an end view partly in section from the front end of the grooving or facing head;

Fig. 6 is a linear exposition of the profile of the cam embodied in the grooving or facing head of Figures 2–5;

Fig. 7 is a longitudinal view, partly in section showing another embodiment of the invention for operating a facing tool;

Fig. 8 is a plan view, partly in section, of the structure of Fig. 7;

Fig. 9 is a view, partly in section, illustrating the lead screw and clutch construction embodied in the apparatus of Fig. 7, and Fig. 10 is a front end view of the Fig. 8 construction.

In Figs. 1–5 there is illustrated one form of the present invention for cutting an internal groove in a work piece. The work piece, as shown in Figure 1, may be an elongated hollow cylindrical member 11 supported to extend horizontaly above a work carriage or platen 12 by spaced work supports 13 mounted on the carriage. The grooving head mechanism, generally indicated at 14, is driven by a rotary horizontal spindle 15 which is driven for rotation by any suitable means. The spindle is supported for rotation in a spindle saddle 16, which is mounted for vertical reciprocation along the vertical column 17 to adjust the height of the spindle. In this instance the work carriage 12 is suitably mounted on the bed 18 for movement toward and away from the spindle and transversely thereof in a horizontal plane to properly position the work piece in desired relation to the groving head.

The grooving head mechanism includes a rear body portion 19 formed with a rearwardly extending tapered stem 20 adapted to be received in the tapered socket 21 of the spindle to hold the body 19 for rotation with the spindle. A holder 22 of irregular shape best illustrated in Figure 3 is fixedly attached to the body 19 by a plurality of cap screws 23 which extend through the holder and are threaded into recesses 24 in the front face of the body 19. A rear stem 25 is formed on the holder to be snugly received in a central aperture 26 formed in the front face of body 19 when the parts are in assembled relation.

A two-piece annular ring is supported on the body 19 and holder 22. One of the ring pieces is an annular back plate 27 which is supported for rotation about an annular inner peripheral face 28 of body 19. The back plate abuts against an annular shoulder 29 formed on the body 19 to extend outwardly therefrom. A plurality of ball bearings are interposed between the inner periphery 30 of the back plate 27 and the peripheral face 28 on body 19. The other ring piece 31 is rotatably supported on an inner circular peripheral face 32 on holder 22 disposed toward the rear thereof. An outstanding annular shoulder 33 is formed on the holder forwardly of face 32 to abut against the front face of ring member 31. At its rear end ring member 31 is secured by screws to the front face of back plate 27 to form a unitary assembly therewith. A plurality of ball bearings are positioned between the holder face 32 and the raceway formed by an inner peripheral face 34 of the ring. The annular ring 27, 31 is positioned axially loosely between shoulder 33 on holder 22 and shoulder 29 on body 19. Except when retarded by the hand of the operator as hereinafter described the ring 27, 31 is carried by body 19 and holder 22 to revolve in unison therewith about the axis of the body 19.

A pinion gear 35 is supported for rotation between opposed spaced apertures 36 and 37 formed respectively in the front face of back plate 27 and in the rearwardly facing portion of ring member 31. Preferably a plurality of needle bearings are positioned in these depressions to form antifriction bearings for the forward and rear stems 38 and 39, respectively of the pinion. Annular washers 40 and 41 are provided at the faces adjacent to the recesses 36 and 37 to space the pinion from the back plate 27 and from the ring member 31. An extreme rearwardly extending annular portion 42 is formed on ring member 31 to extend over pinion 35 to enclose the pinion within the grooving head.

An annular gear 43 is fixed to the body portion 19 by means of a plurality of cap screws 44 so as to revolve in unison with the body 19 about the axis of the latter. Fixed gear 43 meshes with pinion gear 35.

A free gear 45 is mounted forwardly of fixed gear 43 and is also in mesh with the pinion gear. A plurality of roller bearings 46 are interposed between the free gear 45 and the fixed gear 43 and body 19. The free gear has one less tooth around its periphery than the fixed gear, for a purpose which will be apparent hereinafter. The free gear is connected to a cam ring 47 which is positioned to drive a cam follower 48. The cam follower 48 is secured to a slide 49. Slide 49 is approximately T-shaped in configuration, with an upwardly and downwardly extending segment 50 of rectangular cross-section adapted to fit somewhat loosely in a complementarily shaped recess 51 formed in the front face of the holder 22. A horizontal segment 52, also of rectangular cross-section, is formed on the slide to extend rearwardly from reception loosely in a horizontal recess 53 formed in holder 22 and extending rearwardly from recess 51. Top and bottom caps 54, 55 are secured to the top and bottom of holder 22 to close the recess 51 at the top and bottom thereof. A coiled compression spring 56 is seated in a vertical recess at the top of slide 49 to bear against cap 54, so that the slide is normally spring-pressed to the position illustrated in Fig. 2, with the cam follower 48 urged into engagement with cam ring 47.

A front plate 51a extends across the front faces of slide 49 and holder 22. Pivotable upper and lower clamp members 52a and 53a are secured by screws to the front of the slide, and are normally spring-pressed outwardly therefrom by compression springs 54a and 55a. Both clamp members are formed with transversely extending lugs 56a, 57 which are adapted to be clamped against the front face of lugs 58 formed on the cutter holder 59 so that the cutter holder is fixed to and will move in unison with the slide. To release the cutter holder from the slide it is only necessary to rotate the clamps 52a, 53a about their respective pivotal axes so that their transverse lug portions 56a, 57 will be disengaged from the lugs 58. As best seen from Fig. 1, the cutter 60 is adapted to be positioned within the central hollow passage of the work piece to engage the interior periphery thereof for cutting an internal groove therein as it revolves about the axis of the slide.

In the operation of the above-described apparatus, rotation of the spindle 15 serves to rotate the holder 22, body portion 19, and the gear 43 affixed thereto. In the normal condition of the apparatus, rotation of holder 22 and body 19 serves to move pinion gear 35 in unison with the fixed gear 43 in an annular path about the axis of the body 19. Likewise, by virtue of its attachment to the holder 22 the cutter holder 59 is caused to rotate about its axis in unison with the rotating spindle.

When the operator grasps or exerts a downward force by hand pressure on the pinion-carrying ring 27, 31, the ring and the pinion gear 35 are held against movement in unison with fixed gear 43 about the axis of the rotating body portion 19, with the result that the pinion gear is driven by its intermeshing engagement with the rotating fixed gear 43 to rotate about its own axis. In turn, the pinion drives free gear 45 to rotate also. As previously mentioned, the free gear 45 has one less tooth than the fixed gear 43, one suitable arrangement being ninety teeth on gear 43 and eighty-nine teeth on gear 45. As a result, each rotation of the spindle serves to advance free gear 45 one tooth and, in the example mentioned, eighty-nine rotations of the spindle would serve to effect a complete rotation of free gear 45 about its axis. Rotation of the free gear results in movement of the cam 47 to displace the slide 49 by its engagement with cam follower 48. The slide, and therefore the cutter holder, is displaced transversely of the axis of rotation of holder 22 according to the movement of the cam so that the cutter 60 travels an eccentric path and is fed into the work piece. The profile of the cam may have an outline as indicated in Fig. 6, with a dwell from zero to 20 degrees, a rise from 20 degrees to 210 degrees, a dwell from 210 degrees to 270 degrees, and a decline from 270 degrees to 360 degrees. With this construction, a cylindrical groove of given depth will be cut upon a predetermined number of revolutions of the cam ring. It is to be understood that the cam profile may be varied by calculation to produce any desired groove depth.

In Figs. 7-10 there is shown a novel arrangement according to the present invention for controlling movement of a cutter holder vertically relative to the spindle. This mechanism includes a conical rearwardly tapering member 61 adapted to be snugly received at its back end in the spindle socket to rotate therewith. At its forward end the conical member 61 has secured to it a circular adapter 62, which in turn is rigidly connected to a body indicated generally at 63.

A pinion carrying annular ring 64 is loosely supported between a front portion 65 of the body 63 and a rear ring 66 carried thereby to normally maintain ring 64 in assembled relation with respect to the body. Ball bearings are interposed between the pinion ring 64 and the annular faces on the front body portion 65 and the rear ring 66 on which it is supported. The pinion carrying ring is formed with axially spaced, radially inwardly extending arms 67 and 68 which fixedly support a shaft 69. Rotatably mounted on shaft 69 is a pinion gear 70, needle bearings 71 being interposed between the pinion gear and its supporting shaft for anti-friction purposes.

An annular gear 72 is affixed to the body 63 to rotate therewith and is positioned to mesh with the pinion gear for driving the same.

A free annular gear 73 is freely supported on the body 63 forwardly of the fixed gear to be in mesh with the pinion 70, with a plurality of ball bearings interposed between the fixed and free gears to minimize friction.

A lead screw 74, headed at each end, is supported for rotation on the body 63 between upper and lower apertured plates 75, 76. The lead screw meshes with a cutter slide 77 to effect vertical movement thereof by its rotation. A lower clutch member 78 is affixed to the lead screw for effecting a driving connection to the lead screw from the holder. A complementary annular clutch member 79 is loosely supported on the lead screw and is normally spring pressed by compression spring 80 into engagement with the clutch member 78 carried by the lead screw. The clutch member 79 is united to a bevel gear 81 which meshes with beveled annular gear 73a integral with the free gear 73. A pin 82 extends transversely across an elongated axial slot 83 in the lead screw and is held in position by a rod 84 extending along slot 83. Pin 82 is normally positioned with its extremities adapted to move in an annular internal groove 74a formed in the lower end of upper clutch member 79 as the lead screw rotates.

The lead screw is formed with a hexagonal socket 85 communicating with the axial channel 83 at its lower end. A crank 86 is formed with a complementary hexagonal head 87 and a smaller cylindrical pin 88 projecting thereabove. A washer 89 is provided to keep the axial pin 84 within the channel 83. A spring pressed, slidable pin 90 normally closes the bottom hole formed in the pinion carrying ring adjacent to the bottom of the lead screw. Retraction of pin 90 against the force of its associated compression spring 91 enables the operator to insert the crank head 87 into the hexagonal socket of the lead screw for manually rotating the lead screw.

The cutter slide 77 is formed with angularly extending sides 92, 93 adapted to slide in complementarily shaped ways 94, 95, which are attached by a plurality of clamping bolts to the forward face of the body 63. A rearwardly extending hub 96 on the cutter slide is threaded internally to mesh with the lead screw, so that rotation of the lead screw effects movement of the cutter slide lengthwise with respect to the ways 94, 95. The hub 96 carries a plurality of pins 97a which are adapted to engage lugs 98 on the clutch member 78 when one extreme limit of movement of the cutter slide is reached. Similarly at the other extreme limit of movement the pins 97b on the hub engage lugs 99 formed on a lower stop member 100 which is fixed to the lead screw.

In the normal operation of this apparatus, rotation of the spindle serves to rotate the body 63. The pinion gear 70, ring 64, lead screw 74, ways 94, 95, and cutter slide 77 all revolve about the axis of the body 63. The cutter slide does not move relative to the ways so that the facing cutter 97 carried by the cutter slide revolves in a circular path having a fixed center. During this operation of the machine, the pinion gear 70 is carried by the annular gear 72, which is affixed to the rotating holder. At this time, the pinion does not rotate about its own axis, and hence does not drive the free gear 73.

When the operator exerts a slight retarding force on ring 64, as by placing his hand thereon, both the ring 64 and pinion 70 are stopped from revolving about the axis of fixed gear 72. The fixed gear 72 continues to rotate, thereby causing pinion 70 to rotate about its own axis to drive the free gear 73. The thus rotating free gear 73 drives bevel gear 81, which through clutch 79, 78 effects rotation of lead screw 74 about its own axis. Rotation of the lead screw effects movement of the cutter slide 77 along the ways, so as to displace the revolving cutter 97 in a feed movement transversely relative to the body 63 and the spindle for facing the bottom of a hole, or for any facing operation.

The limit of movement of the cutter slide 77 relative to the body 63 is reached when the rear hub 96 on the cutter slide abuts the clutch member 78 on the lead screw, so that the hub pins 97a engage the lugs 98 on the clutch member 78. In this position, the clutch member 78 and also the lead screw 74 are prevented from rotation about the axis of the lead screw, and the clutch member 79 merely slips over the clutch member 78.

The cutter slide having reached its extreme limit of movement, it is desired to return the slide to a position where further rotation of the lead screw will be permitted. This is effected by stopping rotation of the spindle and inserting the crank 86 into the lead screw socket so that crank pin 88 engages one end of the rod 84 to displace the latter lengthwise of the axial lead screw channel 83. The other end of rod 84 bears against cross pin 82 to move the upper clutch member 79 against the urging of its spring 80 out of engagement with the lower clutch member 78. Next, the crank 86 is turned to rotate the lead screw in the opposite direction from which it was rotated through the free gear 73 and clutch 79, 78. Because the clutch members 78 and 79 are disengaged while the crank 86 is in place, such rotation of the lead screw does not cause rotation of free gear 73 in the reverse direction. Reverse rotation of the lead screw returns the cutter slide to the opposite extreme limit of movement at which the hub pins 97b engage the lugs 99 to prevent further manual rotation of the crank 86. In this position of the parts the machine is ready for another operating cycle.

In both illustrated embodiments of the present invention only a slight retarding force, such as by hand pressure, on the pinion-supporting external ring is necessary to drive the free gear from the pinion for displacing the cutter holder or slide transversely of its rotary path. Because of the high mechanical advantage of both illustrated arrangements only a light touch by the operator's hand is required to immediately effect this result, so that the device is readily responsive to the operator's control.

While particular embodiments of the invention have been described in detail herein it is to be understood that there may be changes from the specific illustrated arrangements without departing from the spirit and scope of the present invention.

I claim:

In a grooving or facing head, in combination, a rotary cutter holder, a first gear rotating with the cutter holder coaxial with the axis of rotation thereof, a pinion gear in mesh with said first gear, an annular ring supporting said pinion gear and normally carried by the cutter holder to revolve therewith so that the pinion gear is moved in unison with the first gear about the axis thereof, a free gear meshing with said pinion gear, said ring and said free gear being coaxial with the axis of rotation of the cutter holder, said first gear being operatively responsive to rotation of the cutter holder and the retardation of said annular ring from rotation with the cutter holder to drive said pinion gear for rotation relative to the cutter holder to in turn drive the free gear for rotation relative to the cutter holder, an externally threaded lead screw revolving in unison with the rotating cutter holder, a first clutch member attached to said lead screw, a complementary second clutch member loosely mounted on said lead screw and resiliently urged into engagement with the first clutch member, said second clutch member being driven for rotation by the free gear to drive the lead screw through said first clutch member for rotation relative to the cutting holder, and a cutter-carrying slide revolving in unison with the rotating cutter holder and threadly engaging said lead screw to move lengthwise thereof upon rotation thereof about its own axis to move the cutter transversely of its axis of rotation in response to rotation of the free gear relative to the cutter holder for effecting such rotation of the lead screw.

References Cited in the file of this patent

UNITED STATES PATENTS

| 1,349,434 | Prince | Aug. 10, 1920 |
| 1,575,522 | Barrett | Mar. 2, 1926 |
| 1,820,056 | Drowns | Aug. 25, 1931 |
| 1,994,879 | Tweit | Mar. 19, 1935 |
| 2,093,743 | Steiner | Sept. 21, 1937 |
| 2,383,753 | Wallace | Aug. 28, 1945 |
| 2,629,269 | Nolde et al. | Feb. 24, 1953 |

FOREIGN PATENTS

| 549,904 | Germany | May 6, 1932 |
| 670,703 | Germany | Jan. 24, 1939 |